United States Patent [19]

Rudebeck

[11] Patent Number: 4,461,635
[45] Date of Patent: Jul. 24, 1984

[54] CRYOPUMP OR HEAT PUMP CIRCUIT

[75] Inventor: Viggo Rudebeck, Augustenborg, Denmark

[73] Assignee: Danfoss A/S, Nordborg, Denmark

[21] Appl. No.: 417,458

[22] Filed: Sep. 13, 1982

[30] Foreign Application Priority Data

Oct. 1, 1981 [DE] Fed. Rep. of Germany ....... 3139044

[51] Int. Cl.³ ..................... G05D 23/30; F25B 41/00
[52] U.S. Cl. ..................................... 62/202; 62/210; 62/225
[58] Field of Search ................... 62/202, 225, 210

[56] References Cited

U.S. PATENT DOCUMENTS 2,296,680  9/1942  McLenegan .................. 62/202
3,715,893  2/1973  Werner ........................ 62/202 X
3,735,603  5/1973  Hamilton ..................... 62/210

Primary Examiner—William E. Wayner
Attorney, Agent, or Firm—Wayne B. Easton

[57] ABSTRACT

The invention relates to a cryopump or heat pump circuit having in series a compressor, a condenser, an expansion valve and an evaporator. The expansion valve is controlled as normally by a sensor which is responsive to the superheating of refrigerant at the outlet of the evaporator. In order to assure sufficient dryness of the evaporator output to make the expansion valve operative, the sensor is connected to a heat source which generates a sufficient amount of heat so that the sensor assumes a temperature corresponding to the set superheating.

5 Claims, 3 Drawing Figures

CRYOPUMP OR HEAT PUMP CIRCUIT

The invention relates to a cryopump or heat pump circuit wherein at least a compressor, a condenser, an expansion valve and an evaporator are disposed in series and the expansion valve, set for superheating, is controlled depending on the degree of dryness of the refrigerant at the evaporator outlet with the aid of a sensor thermally connected to the suction line between the evaporator and compressor.

Normally, an expansion valve is controlled depending on the superheating of the refrigerant determined by a sensor at the output of the evaporator. In order that such superheating can be reached relatively to the evaporator temperature, complete evaporation of the refrigerant must already take place in the evaporator. The evaporator output is thereby reduced from a value that could be reached if the degree of dryness of the refrigerant at the evaporator outlet were to be, for example, only 85%. However, as long as the degree of dryness is under 1, there is no superheating and the expansion valve is inoperable.

In a known circuit of the aforementioned kind (DE-AS No. 24 45 065), a conventional expansion valve responsive to superheating can be controlled depending on the degree of dryness of the refrigerant at the evaporator outlet by applying the sensor to a bypass line bridging a heat exchanger which is connected between the evaporator and compressor and in which the refrigerant on the suction side is heated by refrigerant on the pressure side which is hot. In front of the sensor, the bypass line is provided with a heating apparatus which supplies the diverted part of the refrigerant on the suction side with such an amount of heat that superheating necessary for response of the expansion valve takes place. This permits better utilization of the evaporator or the use of a smaller evaporator at a predetermined output. This is of particular interest in the heat pump installations for heating dwellings, where the evaporator is a relatively expensive component. However, the use of a bypass line in conjunction with the heat exchanger increases the expense. Since the sensor is disposed at a spacing behind the compressor outlet, there is a long control path with a corresponding delay in the response of the expansion valve. Since the expansion valve will close only when liquid refrigerant has almost reached the sensor, which is disposed at the end of the bypass line, there is a danger that this liquid refrigerant enters the compressor and damages same.

The invention is based on the problem of providing a cryopump or heatpump circuit of the aforementioned kind wherein the degree of dryness of the refrigerant at the evaporator outlet can be kept at a predetermined value without having to take special precautions in the conduits of the refrigerant circuit.

This problem is solved according to the invention in that the sensor is disposed adjoining the evaporator outlet and is thermally connected to a heat source which delivers such an amount of heat to the sensor during operation of the compressor that, in the presence of the desired degree of dryness, it assumes a temperature corresponding to the set superheating.

In this arrangement, the sensor remains at its usual place, i.e. at the suction line connected to the evaporator outlet. It is therefore disposed directly at that point where the degree of dryness of the refrigerant is to be determined and in any case in front of a subsequent heat exchanger, liquid separator or the like. Contrary to the known superheating control in which the sensor assumes the temperature of the suction gas, the use of the heat source leads to an equilibrium temperature of the sensor. The supplied heat is determined by the heat source and the dissipated amount of heat depends on the degree of dryness of the refrigerant. The more liquid refrigerant is still contained, the higher will be the dissipation of heat and thus the lower the sensor temperature. It is therefore possible to alter the desired degree of dryness either by changing them out of heat transmitted or by changing the overheating setting at the expansion valve. In practice, the latter is preferred. On the whole, practically 100% of the evaporator can be utilized. The speed of response of the regulating circuit corresponds substantially to that of the usual overheating control. As soon as the liquid proportion of the refrigerant becomes too large at the evaporator outlet, the sensor temperature drops correspondingly and the expansion valve can close fully.

It is also favourable if the heat source is associated with a control apparatus which keeps the heat delivered to the sensor substantially constant but, when a limiting value is exceeded, reduces a control quantity depending on the load on the compressor. Below the limiting value, there will therefore be the relationship as described but above the limiting value the evaporator output is reduced so that overloading of the compressor is avoided.

The simplest circuit is obtained if the control apparatus switches off the power supply to the heat source when the limiting value is exceeded. Another possibility is for the control apparatus to reduce the power supply to the heat source with an increase in the control quantity when the limiting value is exceeded. One thereby achieves constant adaptation to the current operating conditions. This gives better control of the cryopump or heat pump circuit without pendulating.

In particular, the motor current of the compressor may form the control quantity. However, other parameters dependent on the load can also be considered, for example the coil temperature of the motor.

The recommended heat source is an electric heating element. This may for example be a resistance wire. However, a PCT resistor or a power resistor is preferred because such heating elements can keep their temperature and thus their heat output substantially constant.

With particular advantage, the heat source is thermally conducted to the suction line only by way of the sensor. One thereby eliminates disruptive heat influences which could act directly on the refrigerant in the suction line.

In a practical embodiment, an electric heating element is disposed on the side of the sensor remote from the suction line and a common clip is clamped about all three components. Compared with the known superheating control, only the heating element need in addition be clamped tight.

With particular advantage, the superheating of the expansion valve is set to at least 10° C. Such high static superheating has the same significance as strong pretensioning of the closing spring in the expansion valve. This gives a rapid closing function as soon as too much liquid refrigerant reaches the range of the sensor from the evaporator. Such an expansion valve may be a standard valve with normal filling. An adaptation to most of the refrigerant types and manners of operation can be achieved merely by selecting the heat output of the heat source.

The invention will now be described in more detail with reference to a preferred example illustrated in the drawing, wherein.

Figure 1:
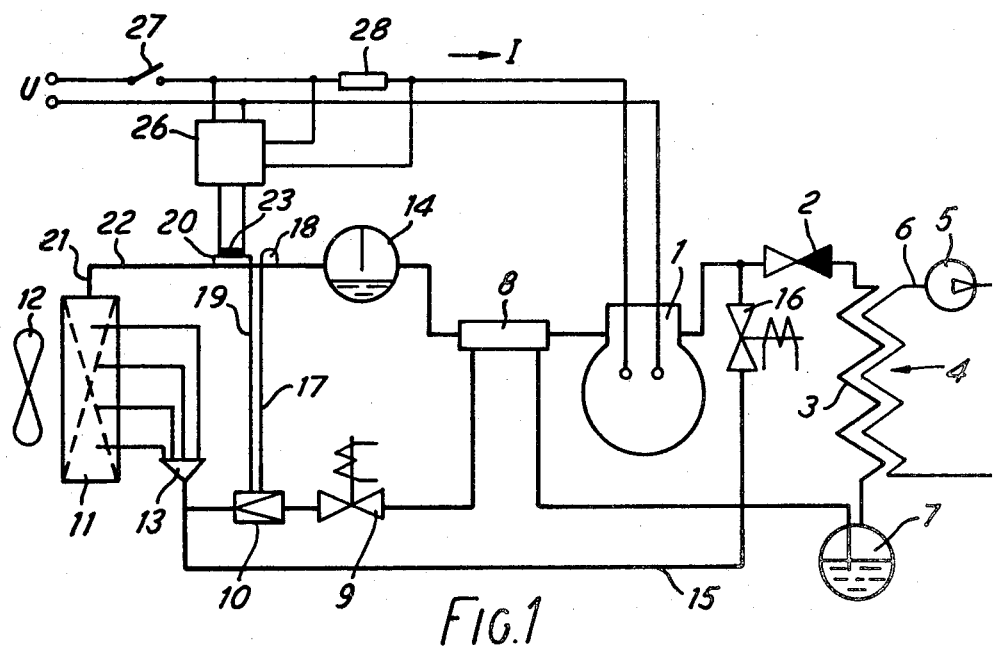
FIG. 1 is a circuit diagram of a heat pump circuit according to the invention.
Figure 2:
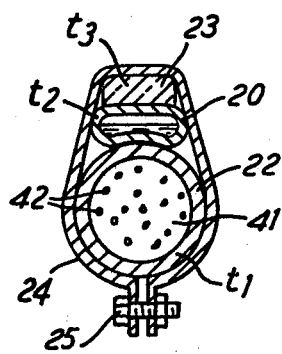
FIG. 2 is a section through the suction line, sensor and heating element.
Figure 3:
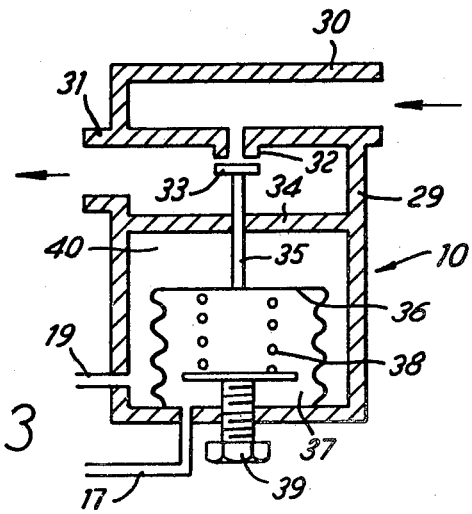
FIG. 3 is a diagrammatic representation of the expansion valve.

In FIG. 1, the heat pump circuit comprises a compressor 1 followed by a check valve 2. This is followed by a condenser 3, which is part of a heat exchanger 4 with the aid of which the heating medium of a heating circuit 6 having a circulating pump 5 is heated. Liquid is collected in a collector 7. This is followed by the primary portion of a heat exchanger 8, a closing magnetic valve 9 and a thermostatic expansion valve 10. An evaporator 11 associated with a fan 12 is supplied with the expanded pressure medium by way of a distributor 13. This is followed by a liquid separator 14, the secondary portion of the heat exchanger 8 and again the compressor 1. For defrosting, there is a bridging line 15 with a closing magnetic valve 16. When the magnetic valve 9 is closed, hot pressure gas can be passed through this bridging line 15 directly into the evaporator 11.

The thermostatic expansion valve 10 is connected by way of a pressure equalising line 17 to a connection 10 connected at the top to the suction line 22 and by way of a capillary tube 19 to a sensor 20. Suction pressure corresponding to the evaporator temperature $t_1$ is supplied to the expansion valve 10 by way of the pressure equalising line 17. The sensor 20 is disposed at a section of the suction line 22 adjoining the outlet 21 of the evaporator 11 and it assumes a temperature $t_2$.

An electric heating element 23 in the form of a PTC resistor is applied to the outside of the sensor 20. By means of a common clip 24 with a clamping screw 25, the heating element 23 and sensor 20 are held to the pipe section 22. The heating element 23 is selectively energised by way of a control apparatus 26 when a thermostatic switch 27 applies a voltage U to the compressor 1.

The control apparatus 26 supplies constant power to the heating element 23 until the motor current I determined at the measuring resistor 28 exceeds a predetermined limiting value. If the motor current I continues to rise, the electric power supplied to the heating element 23 drops proportionally. Alternatively, the control apparatus 26 could contain a switch which opens when the limiting value of the motor current is exceeded and de-energises the heating element 23.

The expansion valve 10 comprises a housing 29 with an inlet connector 30, outlet connector 31 and valve seat 32. The associated closing member 33 is connected to a rod 35 which sealingly passes through a transverse wall 34 and is adjustable by bellows means 36. The latter are loaded in the closing direction by pressure in the chamber 37 and by a spring 38 which is adjustable with the aid of a set screw 39. In the opening direction, the pressure acts in the chamber 40. The chamber 37 is connected to the suction line 22 by way of the pressure equalising line 17 and the chamber 40 is connected to the sensor 20 by way of the capillary tube 19. The sensor has a liquid-vapour filling so that the sensor temperature corresponds to a certain vapour pressure.

Since the circuit is to be operated so that a degree of dryness under 1, e.g. 0.85, operates in the suction line section 22, the refrigerant located in the interior 41 of the associated section of the suction line 22 still contains liquid particles 42. The expansion valve 10 will open only when the vapour pressure depending on the temperature $t_2$ of the sensor 20 is above the pressure in the suction line 22, because the prestressing of the spring 38 has to be overcome. A preferably constant amount of heat is supplied to the sensor 20 with the aid of the heating element 23, for example 10 W at a voltage of 24 V. Accordingly, the heating element will assume a temperature $t_3$. The amount of heat is such that, despite the dissipation of heat at the sensor 20 to the suction gas still containing liquid particles, the sensor temperature $t_2$ corresponds to the set overheating temperature of the expansion valve. If the humidity of the refrigerant increases, the dissipation of heat is larger and $t_2$ drops. On the other hand, if the degree of dryness increases, the dissipation of heat is less and $t_2$ increases.

By selecting the heat output, the arrangement can be adapted to any desired refrigerant. By selecting the stress of the spring 38, one can set the superheating temperature and thus the degree of dryness at the outlet 21 of the evaporator 11. Preferably, high superheating of 10° C. and higher is set. This means that the closing force of the valve is large and the reaction time is correspondingly small upon temperature changes. By means of the load-dependent control of the heat output of the heating element 23, with a standard filling of the thermostatic system of the expansion valve one achieves a similar effect as with control according to the maximum operating pressure (MOP setting) with a special filling, i.e. when the compressor load becomes critical, reduction of the heat output also reduces the evaporator output and thus the compressor output.

To achieve the desired control of the degree of dryness, one can therefore use a conventional expansion valve with normal filling. The refrigerant cycle need not be altered. It is merely necessary to add the heating element with corresponding adaptation or control of the heat output.

I claim:

1. A heat pump assembly, comprising, a compressor, a condenser, and expansion valve which is settable for a predetermined superheating, an evaporator, said items being arranged in series including a suction line between said evaporator and said compressor, a sensor thermally connected to said suction line for sensing the dryness at the outlet of said evaporator for aiding in the control of said valve in accordance with the degree of dryness sensed at said outlet, auxiliary means for supplying sufficient supplementary heat to said sensor to effect the desired predetermined superheating, said auxiliary means normally supplying a substantially constant amount of supplementary heat to said sensor and a reduced amount when a predetermined load on said compressor is exceeded.

2. A heat pump assembly according to claim 1 wherein said supplementary heat is cut-off when said predetermined load on said compressor is exceeded.

3. A heat pump assembly according to claim 1 wherein said auxiliary means includes a PTC resistor.

4. A heat pump assembly according to claim 1 wherein said auxiliary means includes a heating element, said heating element being connected to said sensor.

5. A heat pump assembly according to claim 4 wherein said heating element is attached to said sensor on the side thereof remote from said suction line.

* * * * *